United States Patent [19]

Hynes

[11] Patent Number: 5,368,526
[45] Date of Patent: Nov. 29, 1994

[54] ENDLESS BELT AND A LINK CONSTRUCTION THEREFOR

[76] Inventor: Robert Hynes, 635 Springer Rd., Fairfield, Conn. 06430

[21] Appl. No.: 219,030

[22] Filed: Mar. 28, 1994

Related U.S. Application Data

[63] Continuation-in-part of Ser. No. 959,668, Oct. 13, 1992, Pat. No. 5,320,584.

[51] Int. Cl.⁵ .............................................. F16G 13/02
[52] U.S. Cl. ...................................... 474/207; 474/244; 474/256; 474/265
[58] Field of Search ............... 474/207, 237, 240, 242, 474/244, 248, 255, 256, 265

[56] References Cited

U.S. PATENT DOCUMENTS

| | | | |
|---|---|---|---|
| 1,264,193 | 4/1918 | Leonard | 474/242 |
| 1,861,642 | 6/1932 | Paulson | 474/211 |
| 1,896,407 | 2/1933 | Hoeffleur | 474/211 X |
| 2,766,635 | 10/1956 | Schwarzkopf | 474/211 X |
| 3,231,069 | 1/1966 | Lanham | 474/207 X |
| 3,234,807 | 2/1966 | Morin | 474/207 |
| 3,628,834 | 12/1971 | Anderson | 474/207 X |
| 3,631,732 | 1/1972 | Kleban | 474/256 |
| 4,058,022 | 11/1977 | Pickburn | 474/200 |
| 4,394,901 | 7/1983 | Roinestad | 474/207 X |
| 4,473,365 | 9/1984 | Lapevre | 474/242 X |
| 4,636,181 | 1/1987 | Savolainen et al. | 474/207 |
| 4,932,925 | 6/1990 | Roinestad et al. | 474/206 |
| 4,979,929 | 12/1990 | Hynes | 474/206 |
| 5,305,872 | 4/1994 | Hutton | 198/853 |
| 5,320,584 | 6/1994 | Hynes | 474/207 |

*Primary Examiner*—Roger J. Schoeppel
*Attorney, Agent, or Firm*—Paul A. Fattibene; Arthur J. Fattibene

[57] ABSTRACT

A readily adjustable belt and a link construction wherein a plurality of links of similar construction are detachably connected in end to end relationship to define an endless torque transmitting belt. Each link is formed of an injection molded plastic part having a female end portion and a male end portion arranged such that the male portion of one link can be readily snap-fitted to the female portion of the next adjacent link. The respective links are identical in structure and are provided in complementary interlocking structure to facilitate attachment and to insure positive interlocking engagement of adjacent links, and yet render the links readily detachably connected so as to facilitate rendering a belt readily adjustable. The respective links are also provided with transversely extending indentations formed in the upper and lower surfaces thereof to impart flexibility thereto. Tapering side surfaces are provided with a non-slip textured surface.

12 Claims, 2 Drawing Sheets

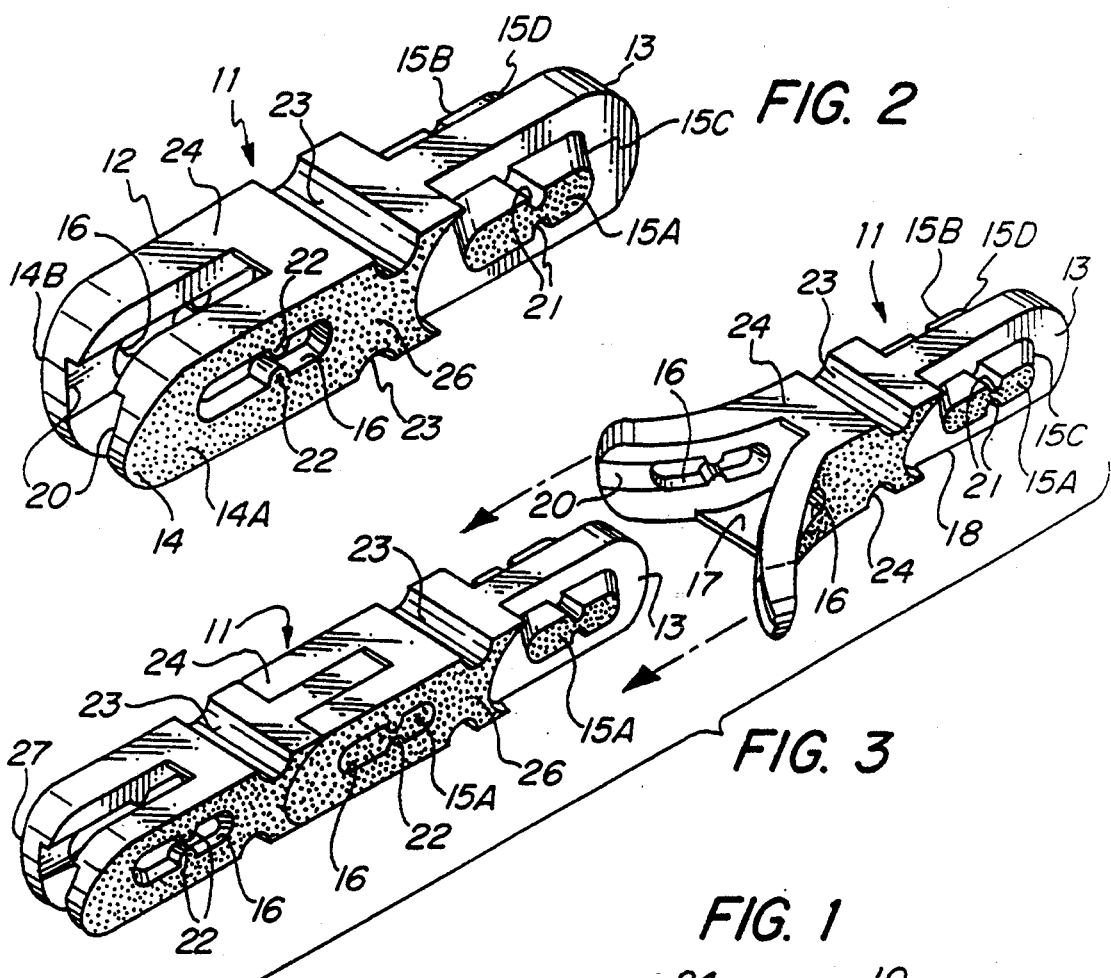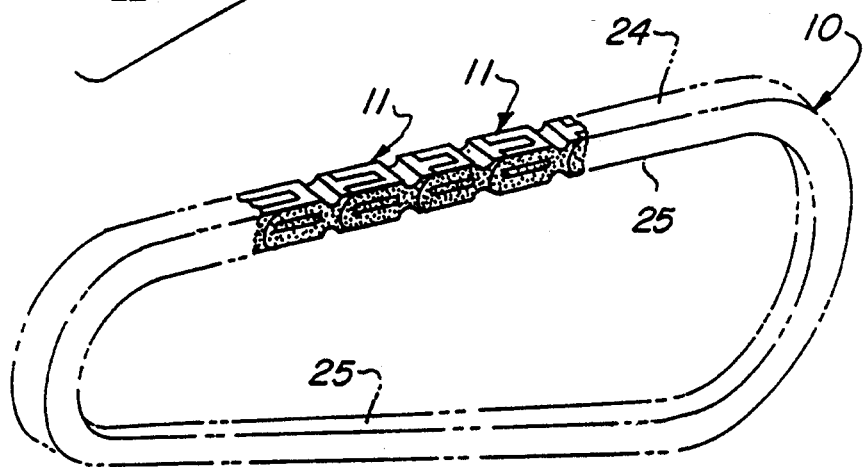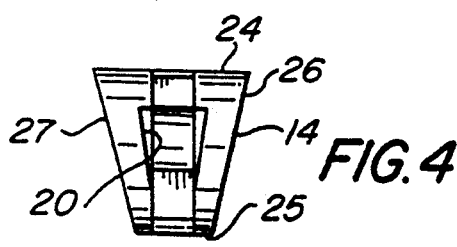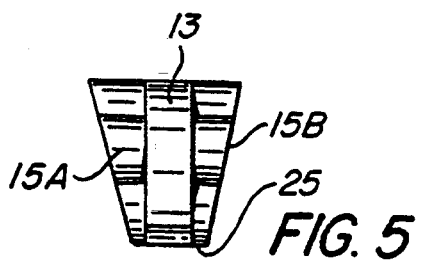

ENDLESS BELT AND A LINK CONSTRUCTION THEREFOR

RELATED APPLICATION

This application is a continuation-in-part application of application Ser. No. 07/959,668 filed Oct. 13, 1992, and now U.S. Pat. No. 5,320,584 issued on Jun. 14, 1994.

FIELD OF THE INVENTION

This invention is directed to an endless belt adapted to be threaded over pulleys for transmitting power and to a specific link construction of which such belt is formed.

1. Related Subject Matter

This invention comprises an improvement in torque transmitting adjustable belt described in my U.S. Pat. No. 4,979,929 granted Dec. 25, 1990.

2. Background of the Invention

Belts are common means to transmit torque between rotating devices. An example of a widespread use of a torque transmitting belt is the belt used in an automobile engine to rotate various accessories, customarily known as the fan belt. Most belts are a continuous loop of fixed length. As a result, there are many different size belts for many different applications. For example, each make and model of automobile is likely to require a different size fan belt. This necessitates the availability of a large inventory of belts varying in size to quickly accommodate the replacement of a worn or broken belt. In order to avoid costly idle or down time of machinery, it is important that a worn or broken belt be replaced quickly.

The replacement of a broken or worn endless belt frequently constitutes a time consuming and tedious task. To replace such endless belts, e.g. in a vehicle, tools are required. This is because some part of the vehicle to which the belt is connected has to be loosened to provide the play necessary to effect the removal of such endless belt. Frequently, the part which must be moved to allow the play is difficult to get to. Thus, considerable effort and time is involved in replacing an endless type belt.

Heretofore, belts with adjustments have been made to compensate for wear, or for use in more than one application within a predetermined relatively small range. One such belt is disclosed in U.S. Pat. No. 1,264,193 issued to H. W. Leonard on Apr. 30, 1918 and entitled "Elastic Belt." Therein disclosed is a belt made up of a number of links or sections. This section can be either elastic or non-elastic, provided there is a sufficient length of elastic portion to give advantageous results. The elastic sections comprise a coiled spring as a core enveloped by a plurality of washers loosely movable over the spring core. Each section is connected to the adjacent section by a threaded hub connector. U.S. Pat. No. 4,058,022 to Pickburn on Nov. 15, 1977, entitled "Mobius Drive Belt Fastener" discloses a belt twisted to form a Mobius strip and a fastener to connect the ends together. The twist in the belt doubles the surface area of the belt contacting the pulleys, thereby extending the life of the belt.

U.S. Pat. No. 3,631,732 to E. Kleban entitled "Adjustable Belt Assembly" discloses a belt having coupling elements for adjusting the length of the belt that are either wholly confined within the cross-sectional area of the belt material or extend from the belt surface and receive a bolt for closing the ends of the belt.

Each of these belts are difficult to install and require tools for their installation. This complicates their quick and easy replacement, especially in emergency situations where assistance and the necessary tools are unavailable.

Also known are link type conveyor belts such as disclosed in U.S. Pat. Nos. 2,766,635; 1,896,407 and 1,861,642. However, such link type conveyor belts are not suitable for use in vehicles or other machine applications for coupling rotating machines for transmitting torque.

My prior patent U.S. Pat. No. 4,979,929 was an effort to overcome the foregoing noted structure. While the structure disclosed in U.S. Pat. No. 4,979,929 proved satisfactory, it was noted that the structure thereof could be further enhanced by additional improvement to facilitate the connection and disconnection of the adjacent links, to enhance the driving characteristic of the belt, to increase the flexibility of the belt and the individual links, and to render the connection between adjacent links stronger, simpler and more positive.

OBJECTS

An object of this invention is to provide an improved belt construction formed of a plurality of similarly constructed links to facilitate the coupling and uncoupling thereof.

Another object is to provide an endless belt formed of a plurality of similarly constructed links having enhanced flexibility.

Another object is to provide an endless belt having improved link construction arranged to provide for a stronger and more positive interconnection between adjacent links.

SUMMARY OF THE INVENTION

The foregoing objects and other features and advantages are attained by a flexible endless belt comprised of a plurality of similarly constructed links that are arranged to be connected in end to end relationship by complementary interlocking members in a manner to facilitate the coupling and uncoupling thereof and to impart greater strength to the connection therebetween. The respective links are preferably injection molded of a suitable plastic material. Each link includes a male end portion and a female end portion. The male portion is provided with opposed laterally extending projections extending longitudinally along the opposed sides of the male end portion. The female end portion is bifurcated to define a clevis having opposed clevis arms for receiving the male end portion of the next adjacent link. The clevis arms are provided with aligned slotted openings for receiving the opposed projections extending laterally of the male end portion of the next adjacent link. To facilitate the connection of adjacent links, the lateral projections of the male end portion are formed with a leading edge which tapers or inclines outwardly and rearwardly toward the female end portion of the link. The trailing edge of the lateral projections are similarly tapered or inclined. The trailing edge taper facilitates secure locking into a female end portion of another adjacent link. The inner surfaces of the clevis arms are provided with a longitudinal groove or channel to receive and guide the projections on the male end portion as one link is being connected to the female portion of the next adjacent link. The arrangement is such that the male end portion is readily assembled to an adjacent link by snap-fitting the male end portion of one link between the clevis arms of the female portion of the next adjacent link.

To enhance the flexibility of the link and belt comprised of such links, each link is provided with a transverse indentation formed in the upper and lower surfaces thereof at a location between the male and female end portions. The opposed side surfaces of the respective links are textured or roughened with a consistent textured spacing and depth to provide for a non-slip surface.

IN THE DRAWINGS

FIG. 1 is a perspective view of an endless belt composed of similarly constructed links embodying the invention.

FIG. 2 is a detail perspective view of a link construction utilized in the belt construction of FIG. 1.

FIG. 3 is an exploded perspective view illustrating the manner of connecting and disconnecting adjacent links.

FIG. 4 is a left end view of the link of FIG. 1.

FIG. 5 is a right end view of the link of FIG. 1.

DETAIL DESCRIPTION

Figure 6:
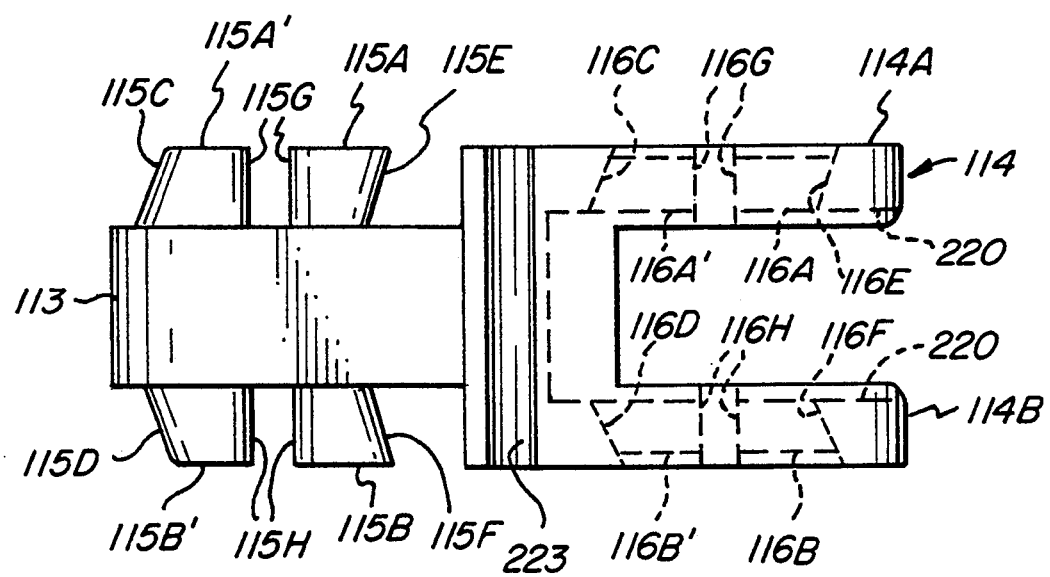
FIG. 6 is a top plan view of another embodiment of the present invention.

Referring to the drawings, FIG. 1 illustrates an endless belt 10 constructed of a plurality of links 11. Each link 11 is similarly constructed, and are preferably formed as an injection molded part of any suitable moldable plastic material. Polyurethane elastomer has been noted as being a suitable plastic from which the respective links may be molded. However, it is understood that other plastics may be suitable depending upon the use to which the belt construction 10 is to be put.

As best seen in FIG. 2, each link 11 includes a body 12 defining male end portion 13 and a female end portion 14. The male end portion 13 has integrally formed thereon opposed laterally extending projections 15A and 15B. Projection 15A, 15B extends longitudinally to define an elongated connecting member which is adapted to be received in a complementary opening formed in the female end portion of a similarly constructed link as will be hereinafter described. The female end portion 14 is bifurcated to define a clevis end having opposed clevis arms 14A, 14B. The respective clevis arms 14A, 14B are provided with aligned slotted openings 16. As shown, the respective slotted opening 16 extends along a longitudinal axis of the link. Interconnected between the clevis arms 14A, 14B defining the female end portion 14 is a web 17 defining a bottom wall. The web 17 terminates inwardly from the free end of the link. The arrangement is such that the opposed free ends of the clevis arms can be flexed outward as shown in FIG. 3. The lower end of the male end portion is cut away at 18 so that in the assembled position of the links, the lower or cut away portion 18 sits upon the web 17.

To facilitate the connection of the male end portion 13 to the female end portion 14 of an adjacent link, the leading edges 15C, 15D of projection 15A, 15B respectively are tapered or inclined outwardly and rearwardly as best seen in FIGS. 1 and 2. The trailing edges of projections 15A, 15B are similarly tapered. The taper of the trailing edges facilitate locking with the female portion of another adjacent link.

To guide projections 15A, 15B of the male end portion 13 to seat the same between the clevis arms 14A, 14B of the next adjacent link, each clevis arm along the inner surface thereof is provided with a longitudinal groove 20 to define a guide way for the projections 15A, 15B as the male end portion of one link is being inserted into the female end portion of the next adjacent link. It will be noted that the tapered or inclined leading edges 15C, 15D of projection 15A, 15B will function to cause a slight spreading of the free end of the clevis arms to facilitate making the connection of adjacent links. The arrangement is such that the male end portion 13 of one link can be readily snap-fitted to the female portion of the next adjacent link to make the connection. Disconnection can be readily achieved by spreading the free end of the clevis arms 14A, 14B outwardly sufficient to effect the release of the male end portion.

To render the interconnection of the projections 15A, 15B within the complementary elongated slotted openings 16 more positive, the projections are formed with an indentation 21 extending transversely thereof in the upper and lower surface thereof. The respective slotted opening of the clevis arms are provided with a complementary transverse bead 22. In the assembled position, the bead 22 of the slotted openings engage the complementary indentation 21 of the projection 15A, 15B.

To enhance the flexibility of the links 11, and in turn of an endless belt formed of such links and for enhancing flexibility of the links over a pulley about which the endless belt 10 is rotated or driven, each link is provided intermediate the ends thereof with a transverse groove or indentation 23 formed in the upper and lower plane surfaces thereof 24, 25 respectively. As shown, the groove or indentation 23 is disposed between the male end portion and the female end portion and provides the link with the ability to be slightly flexed thereabout. This ability to flex enhances the flexibility of the assembled belt, and is particularly advantageous for permitting the assembled belt to flex about small diameter pulleys.

As best seen in FIGS. 4 and 5, the opposed side surfaces 26, 27 of the links taper inwardly toward the bottom surface 25. To enhance the driving effect of the belt 10, the opposed side surface 26, 27 of each link is textured or roughened with a consistent textured spacing and depth to provide for a non-slip side surface. As the belt is in the form of a V type belt, the non-slip side surfaces 26, 27 will frictionally engage the sides of a pulley and thus prevent any slippage therebetween.

Figure 7:
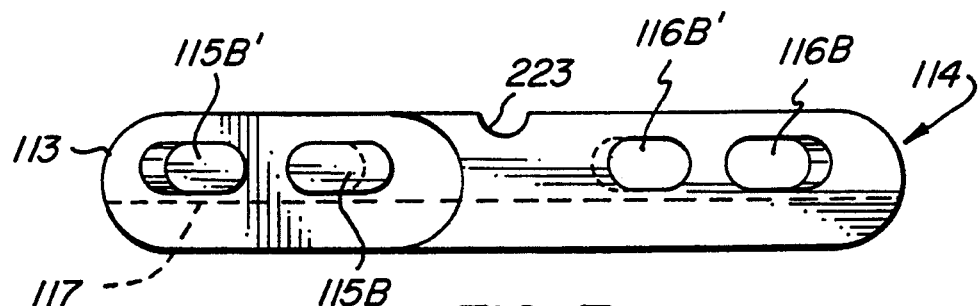
FIG. 7 is a side elevational view of the embodiment illustrated in FIG. 6.
Figure 8:
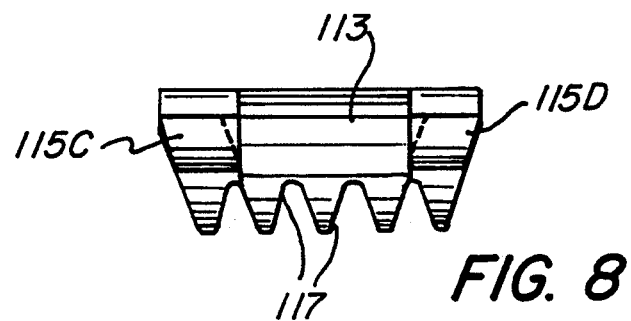
FIG. 8 is an end view of the embodiment illustrated in FIGS. 6 and 7.

Referring to FIGS. 6-8, another embodiment of the present invention is illustrated. A single link of a multi-ribbed flat V-belt is illustrated. The multi-ribbed flat V-belt is similar to the belt illustrated in FIGS. 1-5, however, the multi-ribbed flat V belt is flatter and wider as well as having a series or plurality of ribs on one side.

FIG. 6 clearly illustrates the slightly different structure of this embodiment of the present invention. The link is made up of a male end portion 113 and a female end portion 114. The female end portion 114 has two clevis arms, 114A and 114B. The male end portion 113 has a plurality of projections 115A, 115A′, 115B, and 115B′. Projections 115A′ and 115B′ have a leading edge 115C and 115D that is tapered or inclined slightly towards the female end portion 114. The projections 115A and 115B have a trailing edge portion 115E and 115F that is tapered or inclined slightly toward the female end portion 114. The leading edges 115C and 115D of the projections 115A' and 115B' help to facilitate insertion of the male end portion 113 into an adjacent female end portion 114 of another link, not shown. The trailing edges 115E and 115F of projections 115A and 115B help to lock the male end portion 113 into an adjacent female end portion 114 of another link, not shown. The projections 115A' and 115A have intermediate edges 115G therebetween. Intermediate edges 115G are substantially perpendicular to a longitudinal axis along male end portion 113. Similarly, projections 115B' and 115B have intermediate edges 115H therebetween. The intermediate edges 115H are likewise substantially perpendicular to a longitudinal axis of male end portion 113. These intermediate edges 115G and 115H permit additional surface area for bearing on a female end portion 114 of another link, not shown. This helps to reduce stretch in a belt comprised of a plurality of links, as well as to provide more positive and stronger resistance to separation of the links during tension. The use of a plurality of projections 115A' 115A, 115B and 115B' is particularly applicable and beneficial in a flat multi-ribbed V-belt application. Additionally, the flat multi-ribbed V-belt is preferably made of a high strength urethane elastomer reinforced with polyester fabric.

The female end portion 114 has two clevis arms 114A and 114B. Each clevis arm 114A and 114B has a longitudinal groove 220 therein to help facilitate the insertion of a male end 113. The clevis arm 114A has a plurality of openings 116A and 116A'. The openings 116A and 116A' are sized to be adapted to fit the projections 115A' and 115A of another identical link, not shown. Accordingly, opening 116A' has a leading edge 116C' that is inclined away from the male end portion 113. Opening 116A has a trailing edge 116E that is inclined away from male end portion 113. Openings 116A' and 116A have an intermediate edge 116G that is substantially perpendicular to a longitudinal axis of the male end portion 113. Similarly, clevis arm 114B has a plurality of openings 116B and 116B'. The opening 116B' has a leading edge 116D that is inclined away from the male end portion 113. Opening 116B has a trailing edge 116F that is inclined away from the male end portion 113. Openings 116B' and 116B have intermediate edges 116H that are substantially perpendicular to a longitudinal axis along male end portion 113. Accordingly, it should clearly be appreciated that a male end portion 113 of another identical link, not shown, will fit and lock into the female end portion 114. Therefore, a plurality of links are assembled to form a belt of any required length. A lateral or transverse groove 223 is formed between the male end portion 113 and female end portion 114 to help improve the flexibility of a belt assembled made from a plurality of identical links.

FIG. 7 is a front elevational view of the link illustrated in FIG. 6. In this view, the relative flatness or thinness of this embodiment can be appreciated. Additionally, the ribs 117 along one surface of the link are illustrated in phantom.

FIG. 8 is a front end view of the links illustrated in FIGS. 6 and 7. In this view, the plurality of ribs 117 formed on one surface of the link are clearly illustrated.

The embodiment illustrated in FIGS. 6-8 has an advantageous structure when applied to flat or thin belts. This embodiment, having a plurality of projections 115A, 115A', 115B, 115B', provide for an increased bearing surface that helps to limit the stretch that could be associated with a flatter or thinner belt. Depending upon the dimensions and application, additional projections, for example three or four per side, could be used. Additionally, depending upon the application, the trailing and leading edges of each projection may be inclined. However, the use of a substantially perpendicular intermediate edge between a plurality of projections improves the ease of assembling the male end portions into the female end portions of a plurality of links.

In operation, it will be apparent that the complementary male and female portions of adjacent links can be readily snap-fitted together in a simple and positive manner to form an endless belt of any desired length depending upon the number of links used. Each link is similarly constructed. The arrangement is such that all links being similar, the endless belt so formed can be separated at any link in the event that any adjustment and/or repair is needed. The links provide for assembly and disassembly without the need of any tools. Other than the respective links, no other components are required to make the endless belt.

While the invention has been described with respect to several embodiments, it should be understood and appreciated that variations and modifications may be made without departing from the spirit or scope of the invention.

What is claimed is:

1. An improved link construction for use in a continuous belt formed by a plurality of similarly constructed links comprising:
a body having opposed ends;
one of said opposed ends defining a male portion and the other end of said opposed ends defining a female portion;
said female portion being bifurcated to form clevis having opposed clevis arms for receiving a male portion of a similar link;
said male portion having connected thereto a plurality of opposed laterally extending projections that extend transversely of said male portion, and longitudinally along the length of said male portion;
said clevis arms having a plurality of opposing openings therein, the plurality of opposing openings conforming in shape to the shape of said plurality of opposed laterally extending projections, the plurality of projections being adapted to be received in the plurality of openings of said female portion of a similar link, the plurality of projections having leading ends and trailing ends, at least one of the leading ends and at least one of the trailing ends being inclined toward said female portion to facilitate inserting the male portion of one link into the female portion of a similar next adjacent link.

2. An improved link construction as defined in claim 1 wherein:
said clevis arms include opposed complementary grooves extending longitudinally between the arms of said clevis portion, and
said grooves being disposed for receiving therebetween the lateral projections to facilitate the insertion of said plurality of projections of said male portion into the opposed openings of a female portion of a next adjacent link.

3. An improved link construction as defined in claim 1 wherein said body has inclined side surfaces tapering inwardly toward a bottom thereof to define a trapezoidal shape in cross section.

4. An improved link construction as defined in claim 3 wherein
the inclined side surfaces are provided with a non-slip textured surface.

5. An improved link construction as defined in claim 1 and including
a transversely extending indentation formed in one plane surface of said link between said male and female portions to impart flexibility of said link longitudinally thereof.

6. An improved link construction of claim 1 wherein: said link is injection molded of a plastic material.

7. An improved link construction of claim 6 wherein said material is urethane elastomer reinforced with polyester fabric.

8. An endless, readily adjustable flexible belt comprising
a plurality of similarly constructed links detachably connected in end to end relationship to form an endless closed loop;
each of said links having a body having a male end portion and a connected female end portion,
and said body having an upper plane surface, a lower plane surface, and opposed side plane surfaces,
said side plane surfaces tapering inwardly toward said lower plane surface,
said female end portion being bifurcated to form a clevis,
said clevis having opposed clevis arms,
said clevis arms being formed with a plurality of longitudinally extending slotted opening formed therein,
said male portion including a plurality of opposed longitudinally extending projections extending laterally to either side thereof,
at least one of said plurality of projections having a tapered leading edge,
at least one of said plurality of projections having a tapered trailing edge,
and a transversely extending indentation formed in the upper surface of each link located between said female and said male end portions for imparting flexibility to said belt.

9. An endless, readily adjustable flexible belt as defined in claim 8 wherein
each of said links has a flat upper surface, and said lower plane surface includes a series of longitudinal spaced apart ribs, said ribs projecting outward from said lower plane surface.

10. A plastic flexible belt formed from a plurality of similar links, each of said plurality of similar links comprising:
a male end;
a female end;
at least two projections extending from each longitudinal side of said male end, each of said at least two projections having a leading edge, a trailing edge, and at least two intermediate edges between the leading and trailing edges, the leading and trailing edges being inclined toward said female end; and
a pair of clevis arms extending from said female end, each of said pair of clevis arms having at least two openings therein adapted to receive said at least two projections.

11. A plastic flexible belt formed from a plurality of similar links as in claim 10 further comprising:
a lateral groove formed in one surface of each of said plurality of similar links; and
a plurality of longitudinal ribs formed in each of said plurality of similar links in a surface opposed to the one surface.

12. A plastic flexible belt formed from a plurality of similar links as in claim 11 wherein:
each if said plurality of similar links is formed of a urethane elastomer reinforced with a polyester fabric.

* * * * *